April 14, 1925. 1,533,570
J. G. PROSSER
METHOD AND APPARATUS FOR CONTROLLING THE TRANSFORMATION OF
FLUID ENERGY INTO WORK
Filed Feb. 7, 1920 2 Sheets-Sheet 1
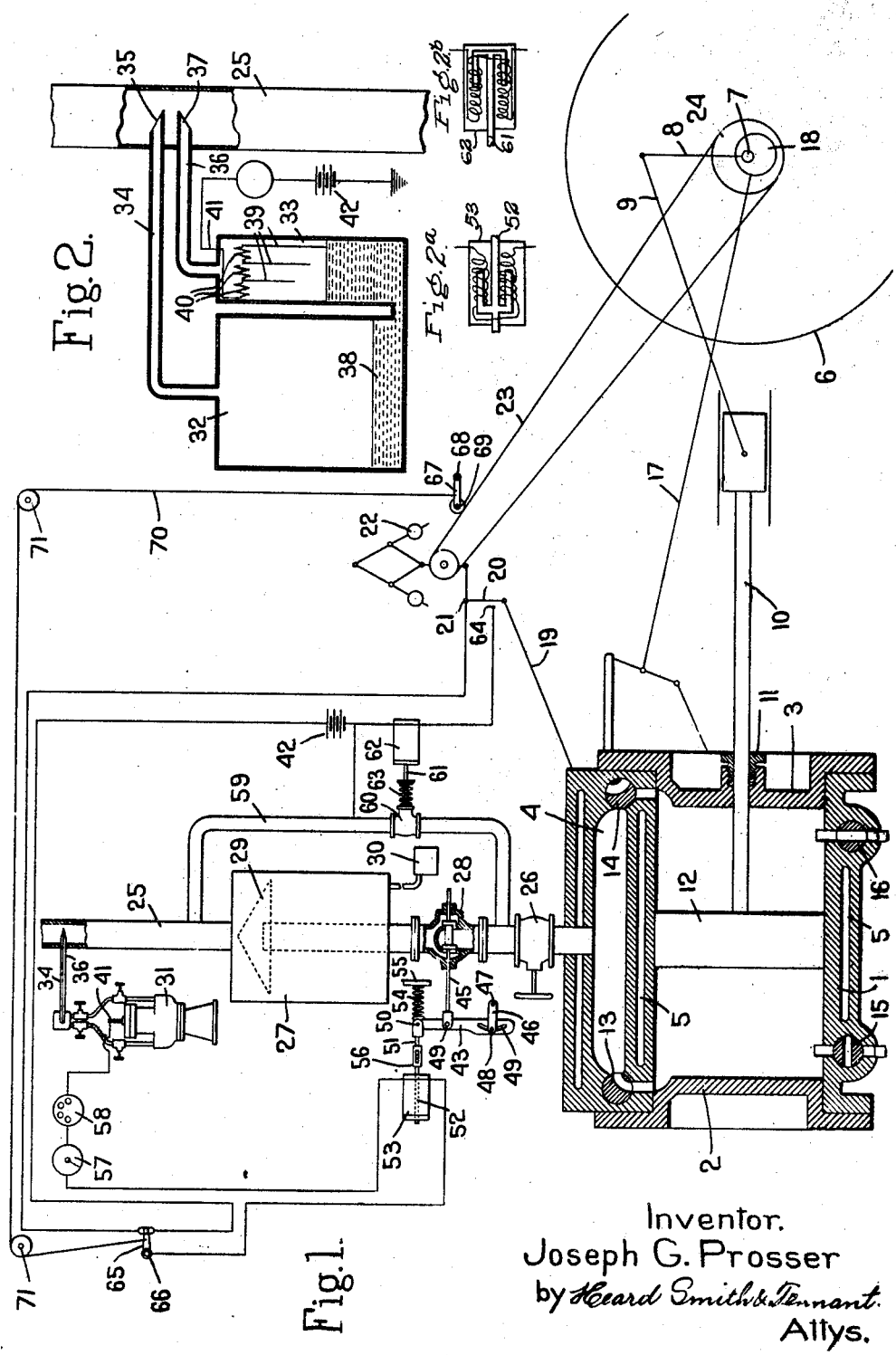
Inventor.
Joseph G. Prosser
by Heard Smith & Tennant.
Attys.

April 14, 1925.

J. G. PROSSER 1,533,570

METHOD AND APPARATUS FOR CONTROLLING THE TRANSFORMATION OF
FLUID ENERGY INTO WORK

Filed Feb. 7, 1920

Inventor.
Joseph G. Prosser
by Heard Smith & Tennant
Attys.

Patented Apr. 14, 1925.

1,533,570

UNITED STATES PATENT OFFICE.

JOSEPH G. PROSSER, OF CHICAGO, ILLINOIS.

METHOD AND APPARATUS FOR CONTROLLING THE TRANSFORMATION OF FLUID ENERGY INTO WORK.

Application filed February 7, 1920. Serial No. 356,982.

*To all whom it may concern:*

Be it known that I, JOSEPH G. PROSSER, a citizen of the United States, residing at Chicago, county of Cook, State of Illinois, have invented an Improvement in a Method and Apparatus for Controlling the Transformation of Fluid Energy into Work, of which the following description, in connection with the accompanying drawing, is a specification, like characters on the drawing representing like parts.

The object of this invention is to secure in the operation of a motor engaged in the transforming of fluid energy into work that there shall be only furnished to the motor fluid containing such energy which when transformed into work under the conditions of the energy cycle involved shall be sufficient to meet the requirements of the motor at the time.

The broad features of this invention have been set forth and claimed in my application Serial No. 356,981 filed concurrently herewith and the present invention is in many of its features subordinate thereto. The controlling apparatus illustrated in my aforesaid application as a preferred embodiment to the invention was of the mechanical type. The principal apparatus herein illustrated is of the electrical type and one feature of the present invention broadly considered is the provision of such an electrically controlled apparatus.

Another object of the present invention is to provide means by which any inequalities of design or manufacture either in an electrical or mechanical control type of apparatus may readily be corrected by adjustment.

The invention has for its further object the provision of automatic means acting in conjunction with the speed governor to minimize the change in the speed of the engine due to sudden reduction in load, and also thereby to prevent the engine from running to dangerous speed as when the load is suddenly thrown off.

The invention has for its further object the provision of an apparatus which may be utilized for controlling the stopping of the engine from points distant from the engine.

The invention has for its further object the provision of means for stopping the engine in case the drive of the speed governor breaks.

These and other objects and features of the invention will appear more fully from the accompanying description and drawings and will be particularly pointed out in the claims.

The drawings illustrate in a more or less diagrammatic form single cylinder counter flow steam engines provided with preferred forms of apparatus embodying the invention, both electrical and mechanical controls being shown, and rendering the steam engines capable of carrying out preferred forms of the process of this invention.

In the drawings—

Fig. 1 is a side elevation partially in vertical cross section and largely diagrammatic illustrating a steam engine provided with an apparatus under electrical control embodying the invention.

Fig. 2 is a diagrammatic view illustrating the principle of operation of the flow meter shown in Fig. 1.

Figs. $2^A$ and $2^B$ illustrate diagrammatically certain solenoids employed in the construction.

Figure 3:
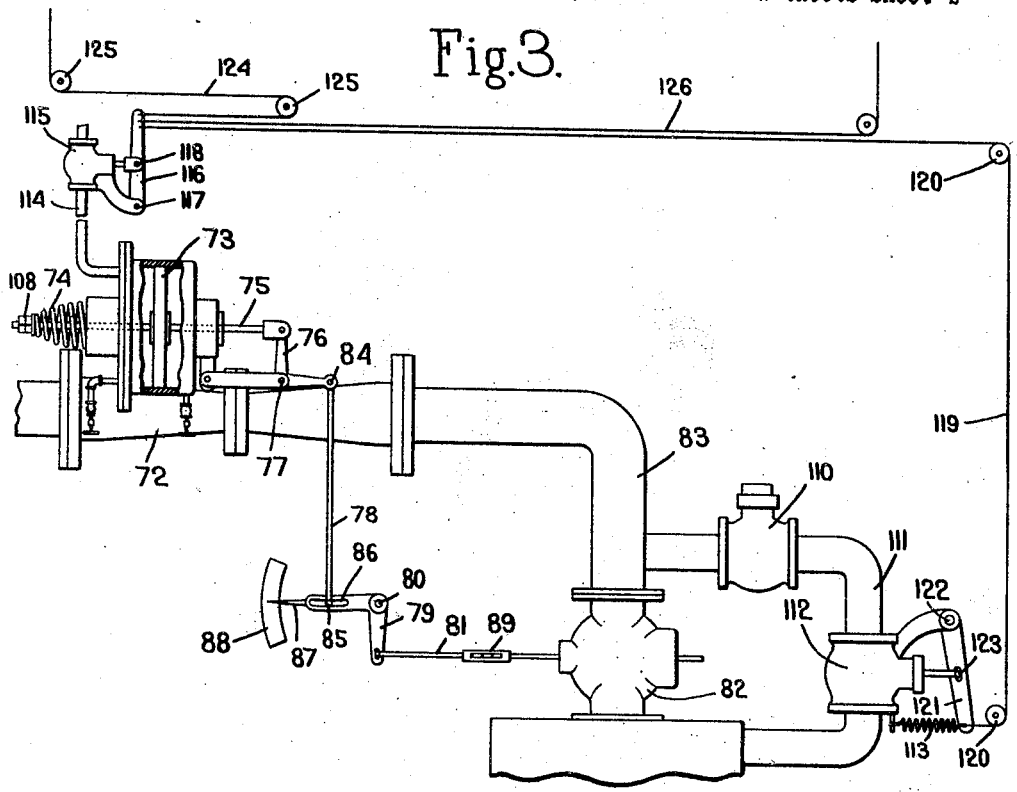

Fig. 3 is a side elevation partially in vertical cross section showing a mechanical form of apparatus provided with a preferred form of adjustment and in which the elastic resistance is shown as a square root spring.

Figure 4:
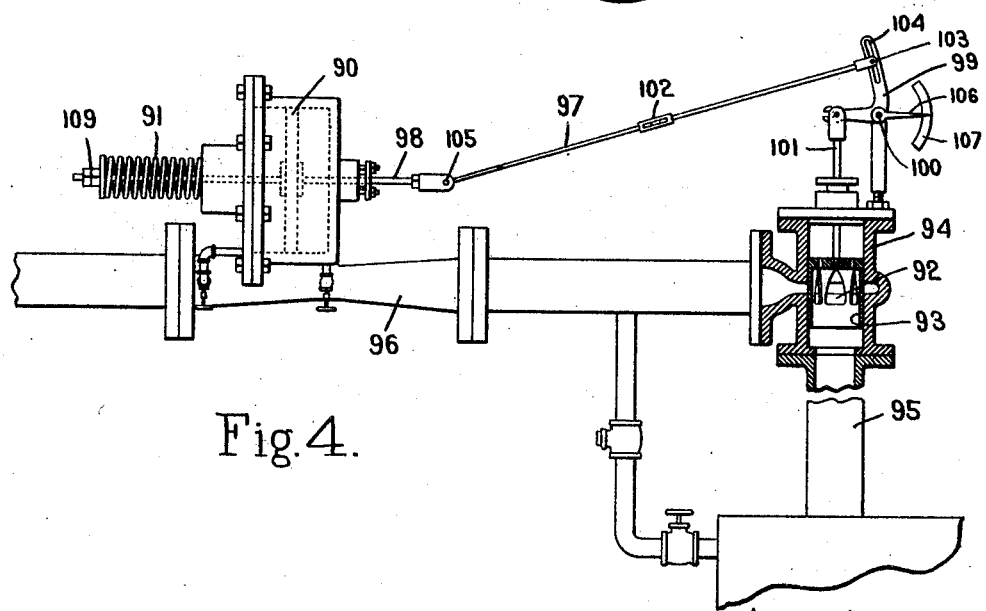

Fig. 4 is a view similar to Fig. 3 of another form of mechanical apparatus in which the elastic resistance is shown as an ordinary spring and in which a controlling valve having an opening constructed on the square root law is shown.

No detail description of the steam engine itself is necessary as the invention is not concerned with the particular features of the engine. An automatic cut off governor is illustrated. This governor is a speed controlling device and prevents the admission of so much steam to the engine as to cause it to run faster than is desired. In the present invention, as in the invention of my aforesaid application, there is combined with the automatic cut off speed governor an apparatus for automatically regulating the flow of steam or the weight of steam admitted to the cylinder, and this combined with the automatic cut off speed governor prevents the engine from taking more steam than is required to do the work of maintaining the speed required at the load.

An ordinary type of counter flow steam engine is shown in Fig. 1. The parts are shown largely diagrammatic. The cylinder 1 is provided with the end walls 2 and 3 and with the steam chest 4 which is preferably jacketed at 5. The fly wheel 6 on the shaft 7 is connected by the crank 8 and a link 9 to the piston rod 10 extending through the stuffing box 11 and in turn connected to the piston 12. The admission valves 13 and 14 and the exhaust valves 15 and 16 may be operated by the usual Corliss valve motion in which a link connection 17 operated by an eccentric 18 on the shaft 7 acts to rock the valves, and a connection 19 extending to a bell crank lever 20 pivoted at 21 and controlled by the fly ball governor 22 which is operated by a belt 23 from a pulley 24 on the shaft 7 acts automatically to determine the point of cut off. But a shaft governor or other speed controlling device may be substituted for the fly ball governor illustrated.

The steam main or pipe 25 extends from the steam chest to the boiler. A suitable manually operated stop valve 26 is located in the steam pipe immediately above the engine.

A suitable receiver separator indicated diagrammatically at 27 and a balanced poppet controlling valve 28 are interposed in the steam pipe. The relative position of the receiver and the controlling valve are determined by the particular conditions. If the controlling valve is above the receiver the result is a more steady flow of steam through the main and a tempering of fluctuations due to changes in load, but at the same time the engine is prevented from shutting down quickly under the action of the controlling valve. If the controlling valve is placed beneath the receiver then it will act immediately when required to shut down the engine, but at the same time the engine will be more subject to fluctuations of speed with the fluctuations of the load. The arrangement of the controlling valve beneath the receiver is shown in the apparatus illustrated in Fig. 1 while the other arrangement is shown in Figs. 3 and 4.

In the form of receiver illustrated the lower section of the steam pipe 25 extends nearly to the top of the chamber of the receiver and is covered with the usual deflector head 29 about the apex of which is the opening from the section of the steam pipe 25 which enters the chamber at the top. A steam trap 30 opens out from the bottom of the receiver chamber.

In carrying out this invention the opening of the controlling valve should vary with the velocity or amount of steam flowing through the pipe. The control of the controlling valve is effected by an apparatus governed by the change in the differential in the static and dynamic pressures due to the changes in velocity of the steam in the pipe. This differential in pressure varies as the squares of the velocity. Consequently the areas of the opening in the pipe as varied by the controlling valve should vary as the square roots of these differentials in pressure in order that these areas may vary with the velocity or amount of flow in the pipe.

Any of the various well known means may be utilized to obtain the differentials in pressure varying with the velocity of the flow such as the Venturi tube, Pitot tubes, restricted orifices, or other devices and in the form of apparatus shown in Fig. 1 the Pitot tube type is adopted.

Various means may also be employed for electrically transmitting variation in the differential in pressure in the main due to the variation in the velocity of flow to the valve opening of the controlling valve. As a practical illustration of such a means there is shown in Fig. 1 an apparatus known as the flow meter, the principle of operation of which is diagrammatically illustrated in Fig. 2.

This flow meter comprises a casing 31 containing two individual connected reservoirs 32 and 33. The Pitot tube 34 having a bevelled opening 35 facing upwardly and the Pitot tube 36 having the bevelled opening 37 facing downwardly extend from the pipe 25 and transmit respectively the dynamic and static pressures caused by the velocity of the flow in the pipe 25 to the reservoirs 32 and 33. Mercury 38 is placed in the bottom of the connected reservoirs. Consequently the differential in pressure transmitted through the Pitot tubes acts to position the level of the mercury in the reservoir 33 and this level rises and falls as the differential in pressure increases or decreases. A series of contact rods 39 are suspended vertically in the reservoir 33 and connected to resistances 40 ending with the terminal post 41 from which the circuit wire leads through the battery or generator 42 to the ground and as the casing of the flow meter 31 is grounded the circuit is completed. The contact rods 39 are gradually decreased in length so that as the mercury rises and successively contacts with these rods, the successive rods in making contact with the mercury cut out the corresponding resistances which are so divided that the flow of the current in the circuit is directly proportional to the velocity of the steam in the pipe. In other words the contact rods 39 are attached to the resistance coils 40 which are so divided between the rods that the current flowing through the circuit varies with the difference in the height between the highest and lowest contact rods that come in contact with the mercury column, which height represents the pressure differential created by the velocity of the flow of the steam in the pipe. In the form thus illustrated the flow meter is thus in itself constructed to cause equal increments in the movement of the controlling valve with equal increments in change of velocity of steam in the pipe. But it is obvious that the flow meter might be constructed to operate on a regular curve and the square root law embodied in the mechanical connections as either in the spring illustrated in Fig. 3 or the valve opening illustrated in Fig. 4.

The variation in the current in the circuit is utilized to control the controlling valve 28 in any suitable manner. The form of apparatus illustrated comprises a floating lever 43 pivoted at 44 to the stem 45 of the valve. A link 46 having a fixed pivot 47 adjustably engages at 48 an arc shaped slot 49 in the lever 43 having its center of curvature at the pivot 47. At its opposite end the lever 43 has an oblong slot engaging a pivot pin 50 on a rod 51 forming at 52 the core of a solenoid 53. A compression spring 54 opposes the action of the solenoid being for example placed between the fixed abutment 55 and the upper end of the lever 43. A turn buckle 56 connects the sections of the rod 51 and enables longitudinal adjustment thereof to be made. The magnet of the solenoid is in the circuit with the flow meter 31. Consequently the variation in the current in this circuit acts through the solenoid 53 to open and close the controlling valve 28 proportionally to the velocity of amount of steam flowing through the pipe.

Any desired suitable gages may be placed in the circuit and as illustrated a gage 57 for indicating the amount of flow in the pipe and a gage 58 for integrating the flow are shown.

The differential in pressure in the Pitot tubes 34 and 36 is therefore at all times balanced by an elastic resistance in the shape of the spring 54 regardless of the area of the controlling valve opening and the pressure of the spring 54 tends continually to reduce the area of the valve opening, and will do so upon any reduction in velocity of the steam in the pipe. Only the demands of the engine for more steam which increases this differential in pressure will over balance the spring and increase the area of the valve opening. So in the other forms of mechanical apparatus illustrated in Figs. 3 and 4 the differential in pressure in the Venturi tube is counter balanced by a similar elastic resistance acting in a similar manner.

With the apparatus thus described the action of the controlling valve might be so to reduce the flow of steam to the engine as to result in stalling the engine. There is therefore provided means for preventing this occurrence. As one such means there is shown a by pass 59 around the controlling valve 28 and this by pass is provided with a valve 60 having its spindle 61 constituting the core of a solenoid 62, the action of which is to open the valve 60 while a spring 63 operates to close the valve. This solenoid 62 is in a circuit including the battery or generator 42 having its terminals 27 21 and 64. The terminal 64 is so positioned with respect to the bell crank 20 of the cut off governor that when the speed of the engine is reduced to a predetermined point and consequently the balls of the governor fall a contact is made between the bell crank 20 and the terminal 64 closing the circuit through the solenoid 62. Thus the valve 60 is opened allowing steam to pass through the by pass directly to the engine. The speed of the engine then increases and the flow of steam through the by pass increases the velocity in the main steam pipe and immediately the apparatus already described acts to open the controlling valve 28 to supply the required amount of steam. As the speed of the engine increases the circuit through the solenoid 62 is broken at 64 and the valve 60 in the by pass closed. The valve 60 and its circuit controlled by the governor 22 thus act automatically to prevent such reduction in flow as to stall the engine.

In adjusting the apparatus steam is admitted to cause the engine to run idle or with a minimum load. The connection 48 is placed preferably about at the middle of the arc slot 49 in the lever 43, the turn buckle 56 is adjusted until the minimum amount of steam that will run the engine is supplied as indicated by the pointer on the indicating gage 57. The load is then increased and if the engine picks up readily this adjustment is satisfactory, otherwise it is altered until it is satisfactory. The maximum load is then thrown on the engine and if necessary the connection 48 moved one way or another along the arc slot 49 to change the leverage until under the new condition the pointer on the gage 57 shows the minimum amount of steam being used. This shifting of the position of the connection to secure the desired result at the maximum load does not effect the adjustment previously made for the minimum load. Thus any inequality or any inaccuracy in the design or construction of the electrical control, the spring 54 or the friction of the parts is automatically corrected because this adjustment permits the amount of wire drawing to be varied at different points. Theoretically if the adjustment is correctly made for any condition it should be correct for all conditions, but the adjustment provided enables any inequalities of design or manufacture readily to be corrected.

The best results will probably be obtained when the area of opening at the valve 28 bears a constant proportion to the velocity of the steam through the pipe, but there may be times under which such variation from such a condition would be beneficial. The introduction of the adjustment, such as provided for by the arc shaped slot 49 in the lever 43 enables such a variation to be made if desired.

Any elastic resistance which will act to reduce the area of opening at the controlling valve 28 will be beneficial if not too powerful in its action, but the best results will be secured when the maximum force which does not interfere with the operation of the engine at any point is applied. The differential in pressure is at all times balanced by the elastic resistance regardless of the area of the opening at the controlling valve and the pressure of this elastic resistance tends continually to reduce the area at the valve opening and will do so upon any reduction of velocity of steam in the pipe. Only the demands of the engine for more steam which increases the differential will exert pressure enough again to increase this area.

The operation of the apparatus has already been made clear by the foregoing description. After the adjustment has been made and the engine shut down the switch 65 will be open and the throttle valve 26 closed. When it is desired to start the engine the throttle valve 26 is opened and the switch 65 is closed, and as the circuit through the solenoid 62 is closed at 64 the solenoid will be energized to open the valve 60 in the by pass 59. At this time the controlling valve 28 is closed and the receiver is filled with steam probably at boiler pressure. Upon the opening of the throttle valve the engine starts taking the steam through the by pass and from the receiver and causing the flow of steam through the pipe 25. This is due to the cylinder-charge of steam reducing the pressure in the receiver whereupon steam would flow through the controller-valve if it should be so set that it remains open to some extent at all times. Otherwise, when the fall in pressure in the receiver has been great enough, the reducing-valve in the by-pass will open and permit steam to flow therethrough into the receiver, thus creating a differential in pressure which is transmitted through the Pitot tubes 34 and 36 to the flow meter and connections already described thus in turn causing the valve 28 to open further with each increase in flow demanded by the work performed by the engine and causing the valve 28 to close more or less when the velocity of the flow reduces the pressure differential.

If the engine is assumed to be running even on a steady load there will be more or less fluctuations of the flow of steam due to the intermittent action of the engine valves, and through the action of the mechanism described the valve 28 will gradually close by increments of movement to such a position as to cause the minimum amount of steam required to develop the power demanded of the engine to flow through the pipe 25.

By regulation of the valves controlling the Pitot tubes 34 and 36, the rapidity with which the level of the mercury 38 responds to fluctuations in velocity of steam through the main 25 may be regulated. These should be set so that the throttle valve 28 would open promptly upon an increased demand for steam by the engine but the effective area of the Pitot tubes is not large enough to permit the mercury level to follow too closely the fluctuations in the velocity of steam as caused by the opening and closing of the engine valves. In other words the level with the mercury will be governed by the mean velocity of the steam through the main.

The tendency to cause the valve 28 to reduce still further the flow of steam will continue doubtless too far and result in cut off taking place later or at a less efficient point. This later cut off will require more steam to be supplied which will then be automatically obtained by a more rapid flow through the valve 28 or through the valve 28 and the by pass 59. This increase in flow of steam will in turn act through the Pitot tubes, flow meter and connections to open the valve 28 to restore it to its former position where the minimum amount of steam was being used. There will, however, be a constant tendency for the valve 28 to close and thus decrease the amount of steam fed to the cylinder.

If the load on the engine be increased the automatic cut off speed governor 22 will act to give a later cut off and more steam will flow into the steam chest to meet the requirements of the later cut off. This increases the velocity of flow through the Pitot tubes and will act through the flow meter and connections to open the valve 28 or the valve 28 and the by pass 59 until sufficient steam is supplied to meet the demands for work performance. If the load on the engine be decreased, the governor 22 will act to give an earlier cut-off and, then, less steam will flow into the steam chest to meet the requirements of this earlier cut-off. This decreases the velocity of flow past the Pitot tubes and will act through the connections to close the valve 28. The tendency of the valve 28 to close continues and the conditions already described are repeated. These variations in the point of cut-off cause variations in the action of the throttling device, and variations in the throttling device cause variations in the point of cut-off. In other words, the speed governor limits the amount of wire drawing that is permissible by the flow meter on the one hand, while any increase in the flow of steam through the main opposite the Pitot tubes limits the amount of wire drawing on the other hand to that amount which will insure economy, and the action of the flow meter is to secure the best combination of initial pressure and point of cut-off. The throttling valve controls throughout a certain range the action of the governor, but is, in its turn, itself checked by the governor if too much wire drawing takes place.

It will be observed that the usual automatic cut off feed governor such as 22 which controls the point of cut off is a device which prevents the engine from taking so much steam that it will run faster than is desired; while the automatic throttling flow governor such as the Pitot tubes, flow meter, valve 28, and connections illustrated as an embodiment of this feature of the invention is an apparatus which when combined with the automatic cut off speed governor prevents the engine from taking more steam than is required to do the work of maintaining that speed at the load.

An apparatus embodying the principles of this invention such as that already described may be applied separately to an engine that is operated on a steady load and used to indicate the amount of wire drawing that is beneficial. It may then be removed and the stop or throttling valve as 26 throttled down until a similar indicator card is obtained. While with the engine thus adjusted variations in quality of pressure of steam, in load, or any external radiation may temporarily make radical differences that are not expected and which would be controlled if the apparatus were a permanent part of the engine, as in the illustrated example, yet good results may thus be obtained when the apparatus used in a manner similar to an ordinary engine indicator.

It is impossible to predict what degree of wire drawing will give the best results in even one engine and at one point of cut off, and if this were ascertained it would be difficult to secure the desired result. But an engine embodying this invention, as for example in the specific construction illustrated, will automatically find and secure substantially this result at all points. In the case illustrated the controlling valve 28 constantly works toward closed position to produce the minimum flow which in turn represents the minimum weight of steam fed to the engine. This invention does not purport to ascertain and secure the most economical use of a given amount of fluid energy because of the necessary limitations fixed by the thermal and structural conditions existing in any given engine. It does, however, ascertain and secure the use of the minimum amount of such energy under the given conditions, that is, in any given motor or engine to which it is attached. The physical and structural conditions in any given motor or engine are, and probably always will be, far from perfect but this invention enables the minimum to be reached subject to these conditions.

The invention also prevents the engine from running wild in case the load be suddenly thrown off, as by the belt breaking, because the controlling valve 28 immediately continues to cut down the supply of steam to meet the requirements of the governor at its minimum point of cut off. It is impossible therefore for the engine to run away.

The invention also enables the engine to be stopped from points distant from the engine. This is frequently desirable in practice and various means have been provided for that end. Such a stopping of the engine can readily be effected by providing switches at the desired points in the controlling circuit. For example one such switch is shown at 65. It will be observed that in the arrangement illustrated the circuit runs from the ground to the terminal 41 of the flow meter, thence through the solenoid 53 to the pivot 66 of the switch 65, thence through the battery 42 and is grounded again as on the by pass 59. The circuit through the solenoid 62 runs through the terminals 64 and 21 to the switch 65 and then back through the battery 42 thus this circuit will also be broken upon the opening of the switch 65. Hence when it is desired to stop the engine the switch 65 is opened and immediately the spring 64 acts to close the valve 28. The circuit through the solenoid 62 is already in most cases open at the terminals 64 so that the valve 60 is closed, but if for any reason this circuit should be closed at the terminal 64 the break made in the circuit by opening the switch 65 will cause the spring 63 to close the valve 60 thus it is impossible for any steam to pass to the engine and the engine immediately stops.

The invention also provides for stopping the engine in case the drive for the speed governor breaks. This drive is shown as a belt 23. A weighted arm 67 is pivoted at 68 and provided with a roller 69 at its free end and rests with the roller on the belt 23. Consequently if the belt breaks the arm 67 will swing downwardly about its pivot. A flexible connector 70 extends from the arm 67 over idlers 71 to the switch 65. Hence when the arm 67 drops upon the breaking of the belt 23 the switch 65 is jerked open thus effecting the stopping of the engine. But it is obvious that any suitable means may be employed for opening the switch 65 or the controlling circuits by or through the breaking of the belt 23.

In my aforesaid application the apparatus illustrated for disclosing the invention embodies the mechanical principle of control, but the feature of adjustment herein disclosed is equally applicable to an apparatus embodying this principle of mechanical control. Consequently in Figs. 3 and 4 of the drawings herein there is illustrated the two forms of apparatus shown in my aforesaid application together with a disclosure of means for effecting this adjustment in each case. As the general construction of these mechanical types of apparatus has been fully set forth in the said application it will be unnecessary to describe the same here in detail. In these constructions the differential in pressure caused by the velocity of flow in the steam pipe is shown as measured by ordinary Venturi tubes and the variation of this differential in pressure transmitted to the controlling valve through mechanical devices.

In Fig. 3 the differential in pressure in the Venturi tube 72 is transmitted to the piston 73 and is counterbalanced by the elastic spring 74. The movement of the piston 73 resulting from the opposing forces of the spring 74 and the differential in pressure is transmitted from the piston rod 75 to the bell crank lever 76 fulcrumed at 77. This bell crank lever 76 is connected by a link 78 to a bell crank lever 79 fulcrumed at 80 and the bell crank lever 79 is in turn connected to the rod 81 of the controlling valve 82 in the steam pipe 83.

The link 78 is pivoted at its upper end at 84 to the bell crank 76 and at its lower end is adjustably secured at 85 in an arc shaped slot 86 of the bell crank lever 80 having its center of curvature at 84. A pointer 87 on the bell crank 79 extends over a gage 88 graduated to indicate the flow in the steam pipe. A turn buckle 89 is inserted in the valve stem 81 to effect the longitudinal adjustment thereof.

In Fig. 4 the elastic resistance opposing the movement of the piston 90 is in the form of an ordinary spring 91 while the required variation is secured in the area of the openings 92 in the sliding valve member 93 of the controlling valve 94 in the steam pipe 95. The movement of the piston 90 under the opposing forces of the spring 91 and the differential in pressure transmitted from the Venturi tube 96 is transmitted to the controlling valve by a link 97 pivotally connected at one end to the piston rod 98 and at the other end to the bell crank lever 99 fulcrumed at 100 and in turn connected to the stem 101 of the sliding member 93 of the controlling valve. The link 97 is provided with a turn buckle 102 by which it is longitudinally adjustable. The link 97 is adjustably connected at 103 to an arc shaped slot 104 in the bell crank 99 having its center of curvature at the pivotal connection 105. A pointer 106 as before is connected to the bell crank 99 and rides over a graduated gage 107 indicating variations in the amount of steam flowing through the pipe.

In both of the constructions shown in Figs. 3 and 4 it will thus be seen that similar adjustments for similar purposes to those already described may be effected by the use of the turn buckles 89 and 102 and the adjustment of the links 78 and 97 in their respective arc shaped slots 86 and 104. In both cases the spring should be designed to oppose the pressure on the piston resulting from the minimum and maximum flows of steam through the pipe. In setting the apparatus the engine is first run with a minimum load and the spring set to expand to a minimum point. The end of the adjusting link is then placed in the middle of the arc shaped slot and the turn buckle and if necessary the tension on the spring adjusted, provision for which is made by the nuts 108 and 109, only the minimum flow of steam as indicated by the pointer over the gage is attained. Then the end of the adjusting link can be swung in the arc shaped slot without effecting this setting. The maximum load is then thrown on the engine and if necessary the adjusting link shifted in the arc shaped slot in one direction or the other until the pointer again shows the minimum amount of steam flowing through the pipe under the new condition. As the spring in each case is designed to meet the minimum and maximum loads, when the adjustment is made for these extremes, any intermediate condition will automatically be taken care of by the spring. Theoretically, if the spring is set correctly for any condition it should be correct for all conditions, but the adjustment provided by the arc shaped slot enables any inequalities of manufacture or otherwise to be corrected.

The feature of invention enabling the engine to be stopped from points distant from the engine when embodied in a mechanical type of apparatus illustrated in Figs. 3 and 4 may take various forms. A preferred form of means for this end is shown in connection with Fig. 3. As therein shown mechanical connections are provided which break the pressure in the cylinder and allow the spring 74 to bring the controlling valve to closed position. But when the pressure reducing valve such as 110 is employed in the by pass 111 steam would be supplied therethrough upon the closing of the controlling valve. Consequently it is necessary to supply another valve 112 which is normally open but which is closed as by the action of a spring 113.

A pipe 114 leads from the cylinder at the left hand end. This pipe opens to the atmosphere and is provided with a valve 115. Consequently if the valve 115 be opened at once the pressure in the cylinder at the left of the piston 73 is relieved and the spring 74 acts to close the controlling valve 82. As the pressure reducing valve 110 upon the closing of the valve 82 would act to admit steam through the by pass it is necessary also to close the by pass.

Any suitable mechanical arrangement may be provided for simultaneously opening the valve 115 and closing the valve 112 and thus securing the desired result. For this purpose a lever 116 fulcrumed at 117 is connected to the stem of the valve 115 at 118. A flexible connector 119 runs from the lever 118 about suitable idlers 120 to a lever 121 fulcrumed at 122 and connected at 123 to the stem of the valve 112. If now the upper end of the lever 116 be pulled to the right the valve 115 will open and the flexible connector 119 will run back along the spring 113 to close the valve 112. The friction in the lever 116 and valve 115 is sufficient so as not to be overcome by the action of the spring 113. Any suitable means may be employed for moving the lever 116 when it is desired to stop the engine. For that purpose a flexible connector 124 is shown extending from the upper end of the lever 116 about idlers 125 which direct it to any desired point. A second similar flexible connector 126 is shown and any number may be employed thus enabling the engine to be stopped from any given distant point.

Having thus described my invention what I claim as new and desire to secure by Letters Patent is:

1. A vapor motor, a feed pipe leading thereto, means controlled by the speed of the motor acting to regulate the quantity of vapor admitted to the motor, a controlling valve in the feed pipe, an electric circuit and connections for operating said valve, an electric resistance in said circuit, means for varying said resistance in accordance with the variation in the differential in the dynamic and static pressures due to variation in the velocity of flow in the feed pipe, an elastic resistance balancing the movement of the controlling valve caused by said electric circuit and connections, the said electric circuit, electric resistance, connections, and elastic resistance including means for causing the opening in the feed pipe controlled by the controlling valve to vary with the said differentials in pressures whereby the said opening varies proportionally with the variation in velocity of flow in the feed pipe.

2. A vapor motor, a feed pipe leading thereto, means controlled by the speed of the motor acting to regulate the quantity of vapor admitted to the motor, a controlling valve in the feed pipe, an electric circuit and connections for operating said valve, an electric resistance in said circuit, means for varying said resistance in accordance with the differentials in the dynamic and static pressures due to variation in the velocity of flow in the feed pipe, and an elastic resistance balancing the movement of the controlling valve caused by said electric circuit and connections whereby the opening in the feed pipe controlled by the controlling valve will vary proportionally with the variations in velocity of flow in the feed pipe.

3. An apparatus as defined in claim 1 in which the said connections include means for adjusting the extent of movement thereof without affecting an initial adjustment thereof.

4. An apparatus as defined in claim 2 in which the said connections include means for adjusting the extent of movement thereof without affecting an initial adjustment thereof.

5. An apparatus as defined in claim 1 in which the said connections include a member pivoted at one end, a second member movable with respect to the first member and means for adjustably connecting the first member to the second member along a curved line having its center at the pivotal point of the first member whereby the extent of movement of the valve may be varied without affecting an initial adjustment.

6. A vapor motor, a feed pipe leading thereto, means controlled by the speed of the motor acting to regulate the quantity of vapor admitted to the motor, a controlling valve in the feed pipe, means connected to the controlling valve and operated by the variation in the differential in the dynamic and static pressures due to variation in the velocity of flow in the feed pipe to cause the opening in the feed pipe controlled by the controlling valve to vary proportionally with the variation in velocity of flow, an elastic resistance opposing the movement of the controlling valve and means for adjusting the movement of the controlling valve without disturbing an initial adjustment.

7. A vapor motor, a feed pipe leading thereto, means controlled by the speed of the motor acting to regulate the quantity of vapor admitted to the motor, a controlling valve in the feed pipe, means connected to the controlling valve and operated by the variation in the differential in the dynamic and static pressures due to variation in the velocity of flow in the feed pipe to cause the opening in the feed pipe controlled by the controlling valve to vary proportionally with the variation in velocity of flow, an elastic resistance opposing the movement of the controlling valve, the said means connected to the controlling valve including a member pivoted at one end, a second member movable with respect to the first member and means for adjustably connecting the first member to the second member along a curved line having its center at the pivotal point of the first member whereby the extent of movement of the valve may be varied without affecting an initial adjustment.

8. A steam engine comprising a cylinder, a piston reciprocable therein, a speed governor acting to vary the cut off, a feed pipe leading to the cylinder, a valve in said pipe, an elastic resistance balancing the flow of steam in said pipe, means connecting said resistance and said valve and acting to give closing and opening movements to said valve respectively as the velocity of flow of the steam in said pipe decreases and increases, and means located at a distant point from the engine for releasing the valve to movement only by the elastic resistance whereby the engine may be stopped.

9. An apparatus having the construction defined in claim 1 together with a switch in said electric circuit whereby when the switch is opened the controlling valve will close under the action of the elastic resistance and stop the motor.

10. An apparatus constructed as defined in claim 1 together with a by pass around the controlling valve, a valve in said by pass, means normally acting to close said valve, an electric circuit and connections acting when the circuit is closed to open said valve and means for closing said circuit when the speed of the engine is reduced to a predetermined point.

11. An apparatus as defined in claim 1 together with means acting upon the failure of the speed controlled means to open the electric circuit and thus cause the controlling valve to close under the action of the elastic resistance and stop the motor.

In testimony whereof, I have signed my name to this specification.

JOSEPH G. PROSSER.